United States Patent
Tang et al.

(10) Patent No.: US 11,093,084 B2
(45) Date of Patent: Aug. 17, 2021

(54) DISPLAY SUBSTRATE, DISPLAY APPARATUS, METHOD OF CONTROLLING A DISPLAY APPARATUS, AND METHOD OF FABRICATING DISPLAY SUBSTRATE

(71) Applicants: BOE Technology Group Co., Ltd., Beijing (CN); Hefei Xinsheng Optoelectronics Technology Co., Ltd., Anhui (CN)

(72) Inventors: Xinyang Tang, Beijing (CN); Tao Jiang, Beijing (CN); Ling Han, Beijing (CN); Tao Ma, Beijing (CN)

(73) Assignees: BOE Technology Group Co., Ltd., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 482 days.

(21) Appl. No.: 16/081,674

(22) PCT Filed: Nov. 28, 2017

(86) PCT No.: PCT/CN2017/113321
§ 371 (c)(1),
(2) Date: Aug. 31, 2018

(87) PCT Pub. No.: WO2019/041594
PCT Pub. Date: Mar. 7, 2019

(65) Prior Publication Data
US 2021/0181870 A1    Jun. 17, 2021

(30) Foreign Application Priority Data
Sep. 1, 2017 (CN) .......................... 201710779512.6

(51) Int. Cl.
*G06F 3/042* (2006.01)
*G06F 3/041* (2006.01)
*G06F 3/0354* (2013.01)

(52) U.S. Cl.
CPC .......... *G06F 3/042* (2013.01); *G06F 3/04166* (2019.05); *G06F 3/03542* (2013.01); *G06F 3/0412* (2013.01); *G06F 2203/04103* (2013.01)

(58) Field of Classification Search
CPC combination set(s) only.
See application file for complete search history.

(56) References Cited

U.S. PATENT DOCUMENTS 5,461,400 A * 10/1995 Ishii ...................... G06F 3/0412
345/182
2011/0241989 A1* 10/2011 Park ........................ G06F 3/042
345/158

(Continued)

FOREIGN PATENT DOCUMENTS

CN    101276790 A    10/2008
CN    201600673 U    10/2010

(Continued)

OTHER PUBLICATIONS

International Search Report & Written Opinion dated Jun. 5, 2018, regarding PCT/CN2017/113321.

(Continued)

*Primary Examiner* — Robin J Mishler
(74) *Attorney, Agent, or Firm* — Intellectual Valley Law, P.C.

(57) ABSTRACT

The present application discloses a display substrate. The display substrate includes a base substrate; a first sensing layer having a plurality of first sensing electrodes extending substantially along a first direction; and a second sensing layer insulated from the first sensing layer and having a plurality of second sensing electrodes extending substan- (Continued)

tially along a second direction. Each of the plurality of first sensing electrodes includes a pair of first sub-electrodes substantially parallel to each other and extending substantially along the first direction, and a plurality of first photoconductive bridges each of which interposed between the pair of first sub-electrodes. Each of the plurality of second sensing electrodes includes a pair of second sub-electrodes substantially parallel to each other and extending substantially along the second direction, and a plurality of second photoconductive bridges each of which interposed between the pair of second sub-electrodes.

20 Claims, 6 Drawing Sheets

(56) References Cited

U.S. PATENT DOCUMENTS

| | | |
|---|---|---|
| 2012/0300165 A1 | 11/2012 | Zhuang et al. |
| 2014/0333848 A1 | 11/2014 | Chen |
| 2016/0139699 A1 | 5/2016 | Barel |
| 2016/0334899 A1 | 11/2016 | Zhou |
| 2017/0084668 A1 | 3/2017 | Wang et al. |
| 2017/0371440 A1 | 12/2017 | Song et al. |
| 2018/0284930 A1 | 10/2018 | Ban et al. |

FOREIGN PATENT DOCUMENTS

| | | |
|---|---|---|
| CN | 101989151 A | 3/2011 |
| CN | 102169267 A | 8/2011 |
| CN | 103345338 A | 10/2013 |
| CN | 103425351 A | 12/2013 |
| CN | 104156130 A | 11/2014 |
| CN | 104461178 A | 3/2015 |
| CN | 104793812 A | 7/2015 |
| CN | 105117075 A | 12/2015 |
| CN | 103677472 B | 6/2016 |
| CN | 106339144 A | 1/2017 |
| CN | 106598360 A | 4/2017 |
| CN | 106643831 A | 5/2017 |
| CN | 106708323 A | 5/2017 |
| CN | 107037926 A | 8/2017 |
| JP | H03239227 A | 10/1991 |
| JP | H11249801 A | 9/1999 |
| JP | 3185171 U | 8/2013 |
| JP | 2014211685 A | 11/2014 |
| WO | 2011031046 A2 | 3/2011 |

OTHER PUBLICATIONS

First Office Action in the Chinese Patent Application No. 201710779512.6, dated Apr. 22, 2020; English translation attached.
Second Office Action in the Chinese Patent Application No. 201710779512.6, dated Feb. 5, 2021; English translation attached.
First Office Action in the Japanese Patent Application No. 2018563691, dated Apr. 22, 2021; English translation attached.

* cited by examiner

DISPLAY SUBSTRATE, DISPLAY APPARATUS, METHOD OF CONTROLLING A DISPLAY APPARATUS, AND METHOD OF FABRICATING DISPLAY SUBSTRATE

CROSS-REFERENCE TO RELATED APPLICATION

This application is a national stage application under 35 U.S.C. § 371 of International Application No. PCT/CN2017/113321, filed Nov. 28, 2017, which claims priority to Chinese Patent Application No. 201710779512.6, filed Sep. 1, 2017, the contents of which are incorporated by reference in the entirety.

TECHNICAL FIELD

The present invention relates to display technology, more particularly, to a display substrate, a display apparatus, a method of controlling a display apparatus, and a method of fabricating a display substrate.

BACKGROUND

Display apparatuses such as liquid crystal display (LCD) apparatuses, organic light-emitting diode display (OLED) apparatuses, and electrophoretic display (EPD) apparatuses have been widely used. In recent years, display apparatuses have been further improved by incorporating touch control functions. The touch control display apparatuses have found a wide range of applications in mobiles phones, personal digital assistance (PDAs), digital cameras, on-board displays, notebook computers, and on-wall televisions.

SUMMARY

In one aspect, the present invention provides a display substrate, comprising a base substrate; a first sensing layer comprising a plurality of first sensing electrodes extending substantially along a first direction; and a second sensing layer insulated from the first sensing layer and comprising a plurality of second sensing electrodes extending substantially along a second direction; wherein each of the plurality of first sensing electrodes comprises a pair of first sub-electrodes substantially parallel to each other and extending substantially along the first direction, and a plurality of first photoconductive bridges each of which interposed between the pair of first sub-electrodes; and each of the plurality of second sensing electrodes comprises a pair of second sub-electrodes substantially parallel to each other and extending substantially along the second direction, and a plurality of second photoconductive bridges each of which interposed between the pair of second sub-electrodes.

Optionally, an electrical resistance of each of the plurality of first photoconductive bridges decreases upon exposure to increasing light levels, and vice versa; and an electrical resistance of each of the plurality of second photoconductive bridges decreases upon exposure to increasing light levels, and vice versa.

Optionally, a first current flow between the pair of first sub-electrodes undergoes a change upon exposure of one of the plurality of first photoconductive bridges to light; and a second current flow between the pair of second sub-electrodes undergoes a change upon exposure of one of the plurality of second photoconductive bridges to light.

Optionally, the plurality of first sensing electrodes and the plurality of second sensing electrodes cross over each other thereby forming a plurality of intersection regions; and the display substrate further comprises an insulating layer between the first sensing layer and the second sensing layer; wherein the insulating layer comprises a plurality of insulating blocks; and each of the plurality of insulating blocks is at one of the plurality of intersection regions.

Optionally, at least some of the plurality of first photoconductive bridges and at least some of the plurality of second photoconductive bridges are outside the plurality of intersection regions; and orthographic projections of the at least some of the plurality of first photoconductive bridges and the at least some of the plurality of second photoconductive bridges on the base substrate are substantially non-overlapping with orthographic projections of the plurality of insulating blocks on the base substrate.

Optionally, at least some of the plurality of first photoconductive bridges are in the plurality of intersection regions; and orthographic projections of the plurality of insulating blocks on the base substrate substantially cover orthographic projections of the at least some of the plurality of first photoconductive bridges on the base substrate.

Optionally, the display substrate further comprises a black matrix; wherein an orthographic projection of the black matrix on the base substrate substantially covers orthographic projections of the plurality of first sensing electrodes and the plurality of second sensing electrodes on the base substrate.

Optionally, the black matrix is on aside of the first sensing layer and the second sensing layer distal to a side of the display substrate configured to receive external light.

Optionally, the plurality of first sensing electrodes and the plurality of second sensing electrodes are configured to be operated in a time-division driving mode; the time-division driving mode comprises a touch control mode and a light control mode; the plurality of first sensing electrodes and the plurality of second sensing electrodes are configured to transmit touch signals during the touch control mode; and one of the plurality of first sensing electrodes are provided with an electrical potential difference between the pair of first sub-electrodes during the light control mode for detecting a first current flow between the pair of first sub-electrodes upon exposure of one of the plurality of first photoconductive bridges to light; and one of the plurality of second sensing electrodes are provided with an electrical potential difference between the pair of second sub-electrodes during the light control mode for detecting a second current flow between the pair of second sub-electrodes upon exposure of one of the plurality of second photoconductive bridges to light.

Optionally, the plurality of first photoconductive bridges and the plurality of second sensing electrodes comprise a photosensitive resistance material.

Optionally, the photosensitive resistance material comprises one or a combination of cadmium sulfide, selenium, aluminum sulfide, lead sulfide, and bismuth sulfide.

Optionally, the photosensitive resistance material has a response time no more than 30 milliseconds; a photocurrent spectrum of the photosensitive resistance material has a peak wavelength in a range of approximately 520 nm to approximately 600 nm; and a ratio of illuminated resistance to unilluminated resistance of the photosensitive resistance material is no more than 0.1.

In another aspect, the present invention provides a display apparatus comprising the display substrate described herein or fabricated by a method described herein.

Optionally, the display apparatus further comprises a black matrix; wherein an orthographic projection of the black matrix on the base substrate substantially covers orthographic projections of the plurality of first sensing electrodes and the plurality of second sensing electrodes on the base substrate; and the black matrix is on a side of the first sensing layer and the second sensing layer distal to a light emitting side of the display apparatus.

In another aspect, the present invention provides a method of controlling a display apparatus described herein, comprising sequentially applying a first electrical potential difference one-by-one to the plurality of first sensing electrodes, the first electrical potential difference being applied between the pair of first sub-electrodes of each of the plurality of first sensing electrodes; sequentially detecting a first current flow one-by-one in the plurality of first sensing electrodes, the first current flow being a current flow between the pair of first sub-electrodes of each of the plurality of first sensing electrodes; sequentially applying a second electrical potential difference one-by-one to the plurality of second sensing electrodes, the second electrical potential difference being applied between the pair of second sub-electrodes of each of the plurality of second sensing electrodes; and sequentially detecting a second current flow one-by-one in the plurality of second sensing electrodes, the second current flow being a current flow between the pair of second sub-electrodes of each of the plurality of second sensing electrodes.

Optionally, the method further comprises determining a light control position by detecting a current flow greater than a first threshold value between the pair of first sub-electrodes of one of the plurality of first sensing electrodes; and detecting a current flow greater than a second threshold value between the pair of second sub-electrodes of one of the plurality of second sensing electrodes.

Optionally, the method further comprises irradiating light in a region of the display apparatus, thereby inducing the increase in the first current flow between the pair of first sub-electrodes of one of the plurality of first sensing electrodes and the increase in the second current flow between the pair of second sub-electrodes of one of the plurality of second sensing electrodes.

Optionally, the display apparatus further comprises a processor configured to execute one or more instructions; the method further comprises selecting a command by the processor from a plurality of programed commands as a selected command based on a location of the light control position; and executing the selected command by the processor.

Optionally, the plurality of first sensing electrodes and the plurality of second sensing electrodes are configured to be operated in a time-division driving mode; the time-division driving mode comprises a touch control mode and a light control mode; the method further comprises transmitting touch signals through the plurality of first sensing electrodes and the plurality of second sensing electrodes during the touch control mode; and sequentially applying the first electrical potential difference one-by-one to the plurality of first sensing electrodes, sequentially detecting the first current flow one-by-one in the plurality of first sensing electrodes, sequentially applying the second electrical potential difference one-by-one to the plurality of second sensing electrodes, and sequentially detecting the second current flow one-by-one in the plurality of second sensing electrodes, during the light control mode.

In another aspect, the present invention provides a method of fabricating a display substrate, comprising forming a first sensing layer comprising a plurality of first sensing electrodes extending substantially along a first direction on a base substrate; and forming a second sensing layer insulated from the first sensing layer and comprising a plurality of second sensing electrodes extending substantially along a second direction; wherein each of the plurality of first sensing electrodes is formed to comprise a pair of first sub-electrodes substantially parallel to each other and extending substantially along the first direction, and a plurality of first photoconductive bridges each of which interposed between the pair of first sub-electrodes; and each of the plurality of second sensing electrodes is formed to comprise a pair of second sub-electrodes substantially parallel to each other and extending substantially along the second direction, and a plurality of second photoconductive bridges each of which interposed between the pair of second sub-electrodes.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a display substrate, a display apparatus, a method of controlling a display apparatus, and a method of fabricating a display substrate that substantially obviate one or more of the problems due to limitations and disadvantages of the related art. In one aspect, the present disclosure provides a display substrate. In some embodiments, the display substrate includes a base substrate, a first sensing layer having a plurality of first sensing electrodes extending substantially along a first direction, and a second sensing layer insulated from the first sensing layer and having a plurality of second sensing electrodes extending substantially along a second direction. Optionally, each of the plurality of first sensing electrodes includes a pair of first sub-electrodes substantially parallel to each other and extending substantially along the first direction, and a plurality of first photoconductive bridges each of which interposed between the pair of first sub-electrodes. Optionally, each of the plurality of second sensing electrodes includes a pair of second sub-electrodes substantially parallel to each other and extending substantially along the second direction, and a plurality of second photoconductive bridges each of which interposed between the pair of second sub-electrodes.

Figure 1:
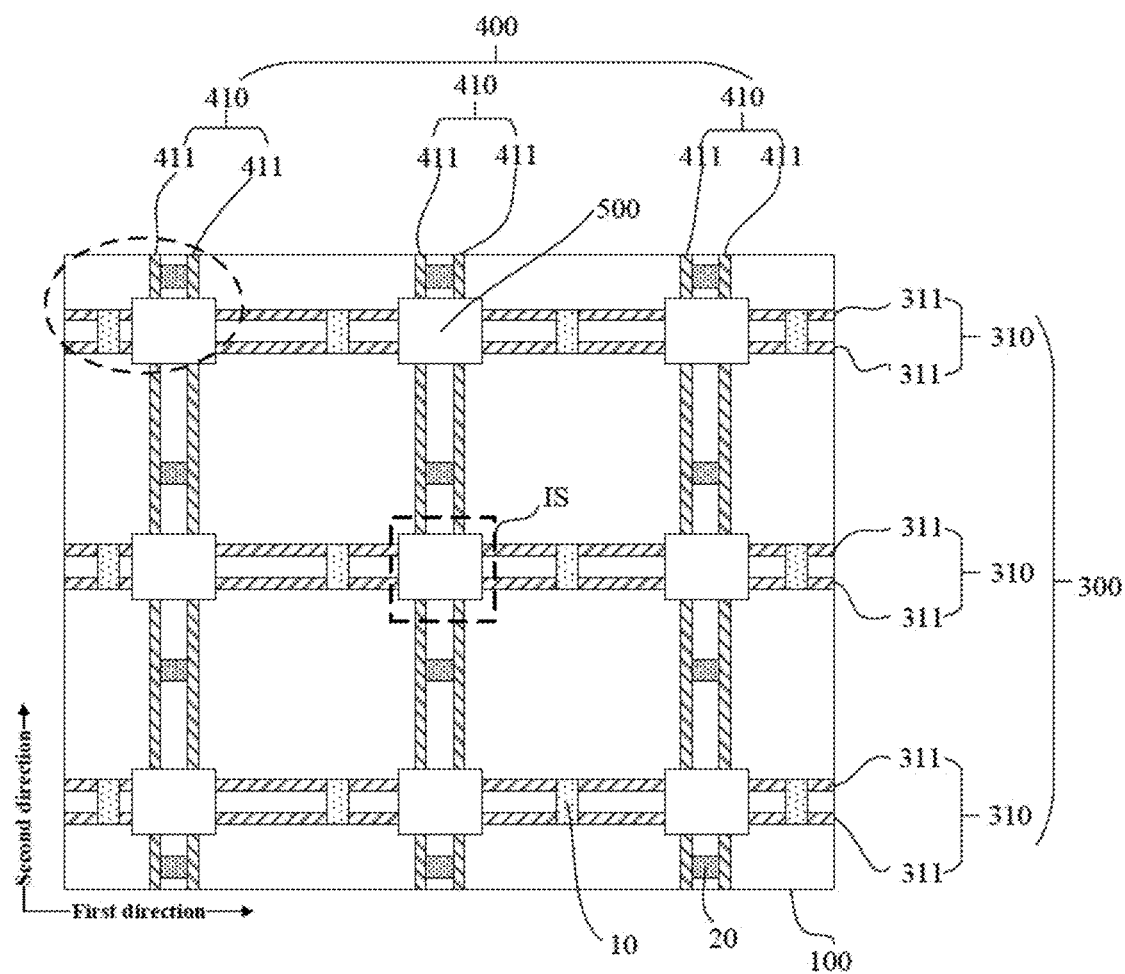
FIG. 1 is a schematic diagram illustrating the structure of a display substrate in some embodiments according to the present disclosure.

FIG. 1 is a schematic diagram illustrating the structure of a display substrate in some embodiments according to the present disclosure. Referring to FIG. 1, the display substrate in some embodiments includes a base substrate 100, a first sensing layer 300 and a second sensing layer 400 on the base substrate 100. The first sensing layer 300 includes a plurality of first sensing electrodes 310, each of which extending substantially along a first direction. The plurality of first sensing electrodes 310 are disposed substantially along a second direction. The second sensing layer 400 includes a plurality of second sensing electrodes 410, each of which extending substantially along a second direction. The plurality of second sensing electrodes 410 are disposed substantially along the first direction. The first sensing layer 300 and the second sensing layer 400 are insulated from each other. For example, the first sensing layer 300 and the second sensing layer 400 may be insulated from each other by an insulating layer, e.g., an insulating layer 500 as shown in FIG. 1. In another example, the first sensing layer 300 and the second sensing layer 400 may be insulated from each other by the base substrate 100, e.g., the first sensing layer 300 and the second sensing layer 400 are on two opposite sides of the base substrate 100. Optionally, the first direction is substantially perpendicular to the second direction.

Referring to FIG. 1, in some embodiments, each of the plurality of first sensing electrodes 310 includes a pair of first sub-electrodes 311 and a plurality of first photoconductive bridges 10. The pair of first sub-electrodes 311 are substantially parallel to each other and extend substantially along the first direction. Each of the plurality of first photoconductive bridges 10 is interposed between the pair of first sub-electrodes 311. Each of the plurality of first photoconductive bridges 10 is in contact with both of the pair of first sub-electrodes 311. Optionally, the plurality of first photoconductive bridges 10 are substantially non-conductive when they are substantially unilluminated. Optionally, the plurality of first photoconductive bridges 10 are conductive when they are illuminated. Optionally, an electrical resistance of each of the plurality of first photoconductive bridges 10 decreases upon exposure to increasing light levels, and the electrical resistance of each of the plurality of first photoconductive bridges 10 increases upon exposure to decreasing light levels. Optionally, when an electrical potential difference is provided between the pair of first sub-electrodes 311, a first current flow between the pair of first sub-electrodes 311 undergoes a change upon exposure of one or more of the plurality of first photoconductive bridges 10 to light.

In some embodiments, each of the plurality of second sensing electrodes 410 includes a pair of second sub-electrodes 411 and a plurality of first photoconductive bridges 20. The pair of second sub-electrodes 411 are substantially parallel to each other and extend substantially along the second direction. Each of the plurality of second photoconductive bridges 20 is interposed between the pair of second sub-electrodes 411. Each of the plurality of second photoconductive bridges 20 is in contact with both of the pair of second sub-electrodes 411. Optionally, the plurality of second photoconductive bridges 20 are substantially non-conductive when they are substantially unilluninated. Optionally, the plurality of second photoconductive bridges 20 are conductive when they are illuminated. Optionally, an electrical resistance of each of the plurality of second photoconductive bridges 20 decreases upon exposure to increasing light levels, and the electrical resistance of each of the plurality of second photoconductive bridges 20 increases upon exposure to decreasing light levels. Option-ally, when an electrical potential difference is provided between the pair of second sub-electrodes 411, a second current flow between the pair of second sub-electrodes 411 undergoes a change upon exposure of one or more of the plurality of second photoconductive bridges 20 to light.

Various appropriate photoconductive materials and various appropriate fabricating methods may be used to make the plurality of first photoconductive bridges 10 and the plurality of second photoconductive bridges 20. In some embodiments, the plurality of first photoconductive bridges 10 and the plurality of second photoconductive bridges 20 include a photosensitive resistance material. Examples of appropriate photosensitive resistance materials include one or a combination of cadmium sulfide, selenium, aluminum sulfide, lead sulfide, and bismuth sulfide. Various appropriate photosensitive resistance materials having various appropriate photo-sensitivities may be used. Optionally, the photosensitive resistance material has a response time no more than 30 milliseconds, e.g., no more than 20 milliseconds, no more than 15 milliseconds, and no more than 10 milliseconds. Optionally, a photocurrent spectrum of the photosensitive resistance material has a peak wavelength in a range of approximately 380 nm to approximately 700 un. e.g., approximately 520 nm to approximately 600 nm, approximately 380 un to approximately 520 nm, and approximately 600 nm to approximately 700 rm. Optionally, a photocurrent spectrum of the photosensitive resistance material has a peak wavelength in a range of approximately 700 nm to approximately 1000 nm. Optionally, a photocurrent spectrum of the photosensitive resistance material has a peak wavelength in a range of approximately 10 nm to approximately 380 nm. Optionally, a ratio of illuminated resistance to unilluminated resistance of the photosensitive resistance material is no more than 0.1, e.g., no more than 0.08, no more than 0.06, and no more than 0.04.

Figure 2:
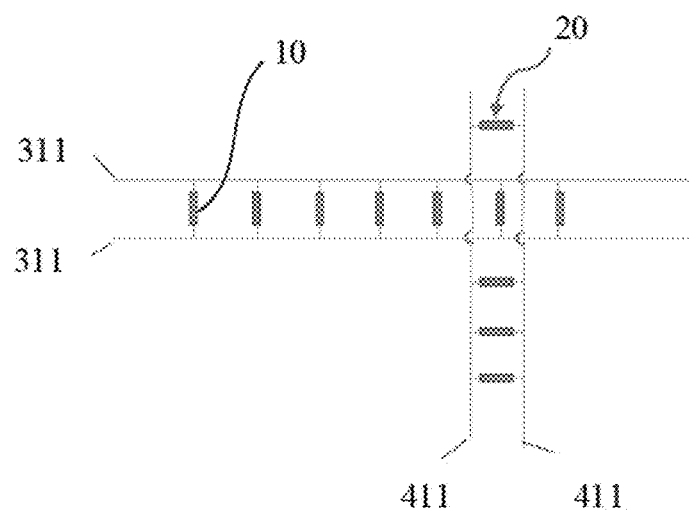
FIG. 2 is a schematic diagram illustrating a circuit structure for light control in a display substrate in some embodiments according to the present disclosure.

FIG. 2 is a schematic diagram illustrating a circuit structure for light control in a display substrate in some embodiments according to the present disclosure. Referring to FIG. 2, the plurality of first photoconductive bridges 10 interposed between the pair of first sub-electrodes 311 are equivalent to a plurality of resistors between the pair of first sub-electrodes 311. When any one of the plurality of first photoconductive bridges 10 is exposed to light, the resistance of exposed photoconductive bridge of the plurality of first photoconductive bridges 10 decreases, and the first current flow between the pair of first sub-electrodes 311 increases when an electrical potential difference is applied between the pair of first sub-electrodes 311. By detecting the change in the first current flow between the pair of first sub-electrodes 311 in each of the plurality of first sensing electrodes 310, light illuminating position along the second direction (e.g., a Y-coordinate) can be determined. Similarly, the plurality of second photoconductive bridges 20 interposed between the pair of second sub-electrodes 411 are equivalent to a plurality of resistors between the pair of second sub-electrodes 411. When any one of the plurality of second photoconductive bridges 20 is exposed to light, the resistance of exposed photoconductive bridge of the plurality of second photoconductive bridges 20 decreases, and the second current flow between the pair of second sub-electrodes 411 increases when an electrical potential difference is applied between the pair of second sub-electrodes 411. By detecting the change in the second current flow between the pair of second sub-electrodes 411 in each of the plurality of second sensing electrodes 410, light illuminating position along the first direction (e.g., a X-coordinate) can be determined. By determining the light illumination positions along the first direction and the second direction, the light illuminating position can be determined.

For example, as shown in FIG. 1, a light illumination position is depicted as a dotted circle. By detecting the change in the first current flow between the pair of first sub-electrodes 311 in each of the plurality of first sensing electrodes 310, it can be determined that the first row of the plurality of first sensing electrodes 310 has at least one of the plurality of first photoconductive bridges 10 being illuminated. By detecting the change in the second current flow between the pair of second sub-electrodes 411 in each of the plurality of second sensing electrodes 410, it can be determined that the first column of the plurality of second sensing electrodes 410 has at least one of the plurality of second photoconductive bridges 20 being illuminated. Accordingly, the light illuminating position can be determined to be in proximity to an intersection between the first row of the plurality of first sensing electrodes 310 and the first column of the plurality of second sensing electrodes 410.

The distribution density of the plurality of first photoconductive bridges 10 and the plurality of second photoconductive bridges 20 can be varied based on design needs. The higher the distribution density, the light illumination position can be determined with higher accuracy. Referring to FIG. 1, the plurality of first sensing electrodes 310 and the plurality of second sensing electrodes 410 cross over each other thereby forming a plurality of intersection regions IS. Optionally, each of the plurality of first sensing electrodes 310 includes at least one (e.g., 1, 2, 3, or 4) of the plurality of first photoconductive bridges 10 between two adjacent intersection regions of the plurality of intersection regions IS. Optionally, each of the plurality of second sensing electrodes 410 includes at least one (e.g., 1, 2, 3, or 4) of the plurality of second photoconductive bridges 20 between two adjacent intersection regions of the plurality of intersection regions IS.

Referring to FIG. 1, in some embodiments, the display substrate further includes an insulating layer 500 between the first sensing layer 300 and the second sensing layer 400. Optionally, the insulating layer 500 includes a plurality of insulating blocks, each of which at one of the plurality of intersection regions IS. Optionally, the insulating layer 500 is an integral layer extending substantially throughout the display substrate.

In some embodiments, at least some of the plurality of first photoconductive bridges 10 and at least some of the plurality of second photoconductive bridges 20 are outside the plurality of intersection regions IS. Optionally, orthographic projections of the at least some of the plurality of first photoconductive bridges 10 and the at least some of the plurality of second photoconductive bridges 20 on the base substrate 100 are substantially non-overlapping with orthographic projections of the plurality of insulating blocks on the base substrate 100.

In some embodiments, at least some of the plurality of first photoconductive bridges 10 are in the plurality of intersection regions IS. Optionally, orthographic projections of the plurality of insulating blocks on the base substrate 100 substantially cover orthographic projections of the at least some of the plurality of first photoconductive bridges 10 on the base substrate 100.

Figure 3:
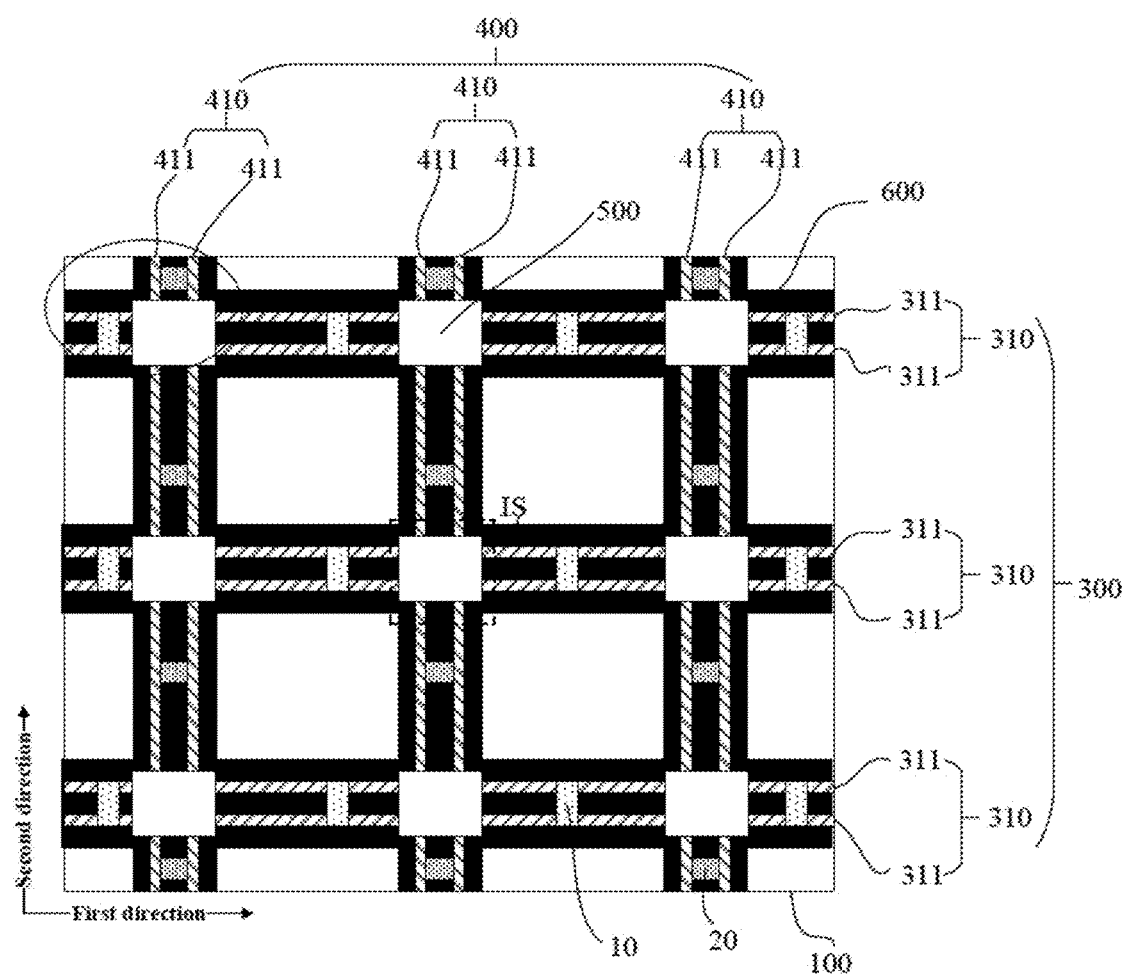
FIG. 3 is a schematic diagram illustrating the structure of a display substrate in some embodiments according to the present disclosure.

FIG. 3 is a schematic diagram illustrating the structure of a display substrate in some embodiments according to the present disclosure. Referring to FIG. 3, in some embodiments, the display substrate further includes a black matrix 600. Optionally, an orthographic projection of the black matrix 600 on the base substrate 100 substantially covers orthographic projections of the plurality of first sensing electrodes 300 and the plurality of second sensing electrodes 400 on the base substrate 100. Optionally, the black matrix 600 is on a side of the first sensing layer 300 and the second sensing layer 400 distal to a side of the display substrate configured to receive external light. In one example, the display substrate is configured to detect light from a laser pen. The black matrix 600 is disposed on a side of the first sensing layer 300 and the second sensing layer 400 distal to a side of the display substrate configured to receive light from the laser pen. By having this design, the black matrix 600 does not block the first sensing layer 300 and the second sensing layer 400 from receiving external light (e.g., the light from the laser pen).

Optionally, the black matrix 600 is on a side of the first sensing layer 300 and the second sensing layer 400 proximal to a light emitting unit in a display apparatus having the display substrate (e.g., an organic light emitting diode or a liquid crystal display module). The black matrix 600 is configured to block the first sensing layer 300 and the second sensing layer 400 from receiving light from the light emitting unit. By having this design, the black matrix 600 prevents the light from the light emitting unit from interfering light sensing by the first sensing layer 300 and the second sensing layer 400.

In some embodiments, the black matrix 600 is on a first side of the base substrate 100, and the first sensing layer 300 and the second sensing layer 400 are on a second side of the base substrate 100, the second side opposite to the first side. The second side is a side of the display substrate configured to received external light, e.g., a light from a laser pen. The first side is a side of the display substrate configured to expose to the light from a light emitting unit in a display apparatus having the display substrate.

In some embodiments, the black matrix 600 is on a first side of the base substrate 100, and the first sensing layer 300 and the second sensing layer 400 are also disposed on the first side of the base substrate 100. The first sensing layer 300 and the second sensing layer 400 are on a side of the black matrix 600 proximal to the external light, e.g., a light from a laser pen, and distal to the light from a light emitting unit in a display apparatus having the display substrate. In one example, the first sensing layer 300 and the second sensing layer 400 are on a side of the black matrix 600 distal to the base substrate 100. In another example, the first sensing layer 300 and the second sensing layer 400 are on a side of the black matrix 600 proximal to the base substrate 100.

In some embodiments, the display substrate is a color filter substrate. In some embodiments, the display substrate is an array substrate.

In some embodiments, the plurality of first sensing electrodes 310 and the plurality of second sensing electrodes 410 are configured to be operated in a time-division driving mode. The time-division driving mode includes a touch control mode and a light control mode. Optionally, the plurality of first sensing electrodes 310 and the plurality of second sensing electrodes 410 are a plurality of touch electrodes configured to transmit touch signals during the touch control mode. In one example, the plurality of first sensing electrodes 310 are a plurality of touch sensing electrodes, and the plurality of second sensing electrodes 410 are a plurality of touch scanning electrodes. In another example, the plurality of first sensing electrodes 310 are a plurality of touch scanning electrodes, and the plurality of second sensing electrodes 410 are a plurality of touch sensing electrodes.

Optionally, during the light control mode, one of the plurality of first sensing electrodes 310 are provided with an electrical potential difference between the pair of first sub-electrodes 311 for detecting a first current flow between the pair of first sub-electrodes 311 upon exposure of one of the plurality of first photoconductive bridges 10 interposed between the pair of first sub-electrodes 311 to light. Optionally, during the light control mode, one of the plurality of second sensing electrodes 410 are provided with an electrical potential difference between the pair of second sub-electrodes 411 for detecting a second current flow between the pair of second sub-electrodes 411 upon exposure of one of the plurality of second photoconductive bridges 20 interposed between the pair of second sub-electrodes 411 to light.

In another aspect, the present disclosure provides a display apparatus having a display substrate described herein or fabricated by a method described herein. Optionally, the display apparatus is a liquid crystal display apparatus. Optionally, the display apparatus is an organic light emitting diode display apparatus. Optionally, the display apparatus is an electrophoretic display apparatus. Examples of appropriate display apparatuses include, but are not limited to, an electronic paper, a mobile phone, a tablet computer, a television, a monitor, a notebook computer, a digital album, a GPS, etc.

In some embodiments, the display apparatus further includes a black matrix. Optionally, an orthographic projection of the black matrix on the base substrate substantially covers orthographic projections of the plurality of first sensing electrodes and the plurality of second sensing electrodes on the base substrate. Optionally, the black matrix is on a side of the first sensing layer and the second sensing layer distal to a light emitting side of the display apparatus.

In another aspect, the present disclosure provides a method of controlling a display apparatus described herein. In some embodiments, the method includes illuminating a region of the display apparatus; detecting the current flow in the plurality of first sensing electrodes and the plurality of second sensing electrodes thereby determining light illumination region. Optionally, the method further includes querying a plurality of pre-determined control instructions to obtain a first control instruction corresponding to the determined light illumination region; and executing a functional module corresponding to the first control instruction. Accordingly, remote control (e.g., light control) in the display apparatus can be realized. In one example, the display apparatus can be controlled by a laser. In another example, a display panel of the display apparatus includes a plurality of regions, each of which corresponding to one of a plurality of functional modules. Once the light illumination region is determined, the functional module corresponding to the determined light illumination region can be executed. In another example, the method includes playing a video clip or opening a hyper link by illuminating light on a certain region of the display panel, e.g., during a Power-Point presentation. In another example, the method includes starting or controlling a video camera by illuminating light on a certain region of the display apparatus.

In some embodiments, the method includes sequentially applying a first electrical potential difference one-by-one to the plurality of first sensing electrodes, the first electrical potential difference being applied between the pair of first sub-electrodes of each of the plurality of first sensing electrodes; and sequentially detecting a first current flow one-by-one in the plurality of first sensing electrodes, the first current flow being a current flow between the pair of first sub-electrodes of each of the plurality of first sensing electrodes. Optionally, the method further includes sequentially applying a second electrical potential difference one-by-one to the plurality of second sensing electrodes, the second electrical potential difference being applied between the pair of second sub-electrodes of each of the plurality of second sensing electrodes; and sequentially detecting a second current flow one-by-one in the plurality of second sensing electrodes, the second current flow being a current flow between the pair of second sub-electrodes of each of the plurality of second sensing electrodes.

In some embodiments, the method further includes determining a light control position. Optionally, the step of determining the light control position includes detecting a current flow greater than a first threshold value between the pair of first sub-electrodes of one of the plurality of first sensing electrodes. Optionally, the step of determining the light control position includes detecting an increase greater than a first threshold value of a current flow between the pair of first sub-electrodes of one of the plurality of first sensing electrodes. Optionally, the step of determining the light control position includes detecting a current flow between the pair of first sub-electrodes of each of the plurality of first sensing electrodes, and selecting one of the plurality of first sensing electrodes having a maximum current flow among the plurality of first sensing electrodes.

Optionally, the step of determining the light control position further includes detecting a current flow greater than a second threshold value between the pair of second sub-electrodes of one of the plurality of second sensing electrodes. Optionally, the step of determining the light control position includes detecting an increase greater than a second threshold value of a current flow between the pair of second sub-electrodes of one of the plurality of second sensing electrodes. Optionally, the step of determining the light control position includes detecting a current flow between the pair of second sub-electrodes of each of the plurality of second sensing electrodes, and selecting one of the plurality of second sensing electrodes having a maximum current flow among the plurality of second sensing electrodes.

Optionally, by detecting a current flow greater than a first threshold value between the pair of first sub-electrodes of one of the plurality of first sensing electrodes and detecting a current flow greater than a second threshold value between the pair of second sub-electrodes of one of the plurality of second sensing electrodes, the light control position can be determined. Optionally, by detecting an increase greater than a first threshold value of a current flow between the pair of first sub-electrodes of one of the plurality of first sensing electrodes and detecting an increase greater than a second threshold value of a current flow between the pair of second sub-electrodes of one of the plurality of second sensing electrodes, the light control position can be determined. Optionally, by selecting one of the plurality of first sensing electrodes having a maximum current flow among the plurality of first sensing electrodes and selecting one of the plurality of second sensing electrodes having a maximum current flow among the plurality of second sensing electrodes, the light control position can be determined.

Optionally, the first threshold value is a specific value. Optionally, the first threshold is a range of values. Optionally, the second threshold value is a specific value. Optionally, the second threshold is a range of values.

In some embodiments, the method further includes irradiating light in a region of the display apparatus, thereby inducing the increase in the first current flow between the pair of first sub-electrodes of one of the plurality of first sensing electrodes and the increase in the second current flow between the pair of second sub-electrodes of one of the plurality of second sensing electrodes.

In some embodiments, the display apparatus further includes a processor configured to execute one or more instructions. Optionally, the method further includes selecting a command by the processor from a plurality of programed commands as a selected command based on a location of the light control position; and executing the selected command by the processor.

In some embodiments, the plurality of first sensing electrodes and the plurality of second sensing electrodes are configured to be operated in a time-division driving mode. Optionally, the time-division driving mode includes a touch control mode and a light control mode. Optionally, the method further includes transmitting touch signals through the plurality of first sensing electrodes and the plurality of second sensing electrodes during the touch control mode; and sequentially applying the first electrical potential difference one-by-one to the plurality of first sensing electrodes, sequentially detecting the first current flow one-by-one in the plurality of first sensing electrodes, sequentially applying the second electrical potential difference one-by-one to the plurality of second sensing electrodes, and sequentially detecting the second current flow one-by-one in the plurality of second sensing electrodes, during the light control mode.

In another aspect, the present disclosure provides a method of fabricating a display substrate. In some embodiments, the method includes forming a first sensing layer having a plurality of first sensing electrodes extending substantially along a first direction on a base substrate; and forming a second sensing layer insulated from the first sensing layer and having a plurality of second sensing electrodes extending substantially along a second direction. Optionally, each of the plurality of first sensing electrodes is formed to include a pair of first sub-electrodes substantially parallel to each other and extending substantially along the first direction, and a plurality of first photoconductive bridges each of which interposed between the pair of first sub-electrodes. Optionally, each of the plurality of second sensing electrodes is formed to include a pair of second sub-electrodes substantially parallel to each other and extending substantially along the second direction, and a plurality of second photoconductive bridges each of which interposed between the pair of second sub-electrodes.

In some embodiments, the plurality of first sensing electrodes and the plurality of second sensing electrodes are formed to cross over each other thereby forming a plurality of intersection regions. Optionally, the method further includes forming an insulating layer between the first sensing layer and the second sensing layer. Optionally, the step of forming the insulating layer includes forming a plurality of insulating blocks. Optionally, each of the plurality of insulating blocks is formed at one of the plurality of intersection regions.

Optionally, at least some of the plurality of first photoconductive bridges and at least some of the plurality of second photoconductive bridges are formed outside the plurality of intersection regions. Optionally, the plurality of first photoconductive bridges and the plurality of second photoconductive bridges are formed so that orthographic projections of the at least some of the plurality of first photoconductive bridges and the at least some of the plurality of second photoconductive bridges on the base substrate are substantially non-overlapping with orthographic projections of the plurality of insulating blocks on the base substrate. Optionally, at least some of the plurality of first photoconductive bridges are in the plurality of intersection regions. Optionally, the plurality of first photoconductive bridges are formed so that orthographic projections of the plurality of insulating blocks on the base substrate substantially cover orthographic projections of the at least some of the plurality of first photoconductive bridges on the base substrate.

In some embodiments, the method further includes forming a black matrix. Optionally, the black matrix is formed so that an orthographic projection of the black matrix on the base substrate substantially covers orthographic projections of the plurality of first sensing electrodes and the plurality of second sensing electrodes on the base substrate. Optionally, the black matrix is formed on a side of the first sensing layer and the second sensing layer distal to a side of the display substrate configured to receive external light.

Figure 4A:
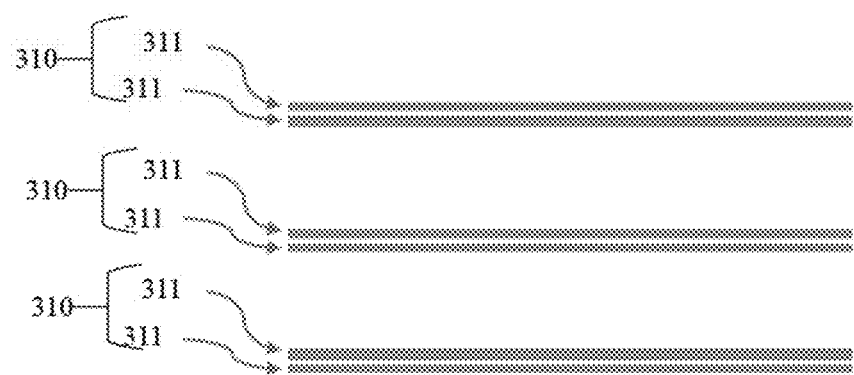
FIGS. 4A to 4E illustrate a process of fabricating a display substrate in some embodiments according to the present disclosure.
Figure 4B:
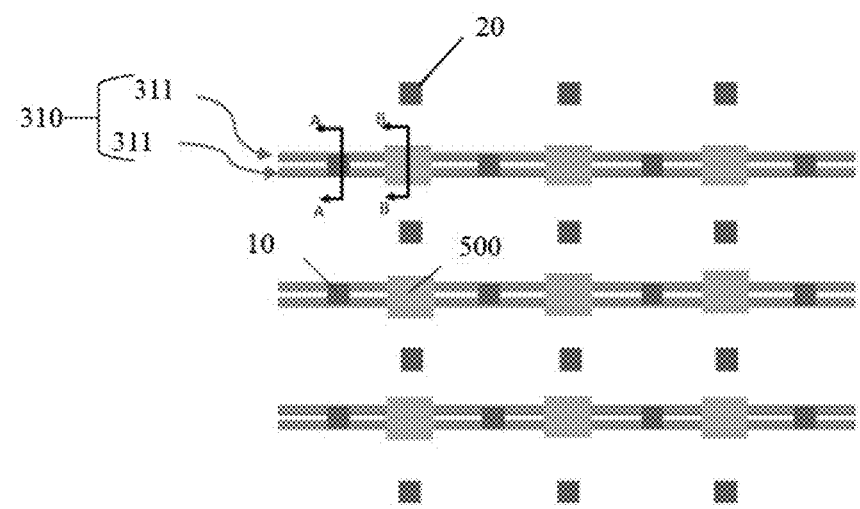
Figure 4C:
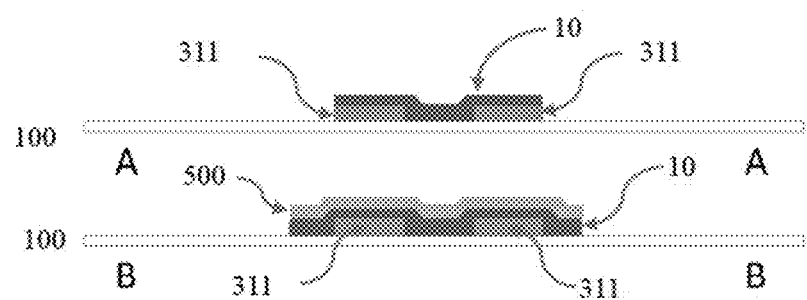
Figure 4D:
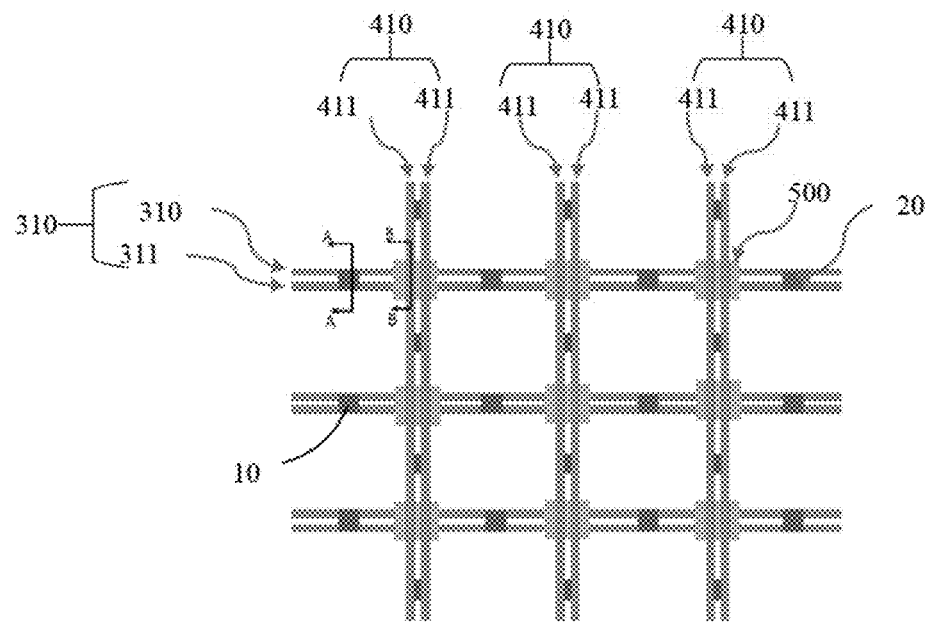
Figure 4E:
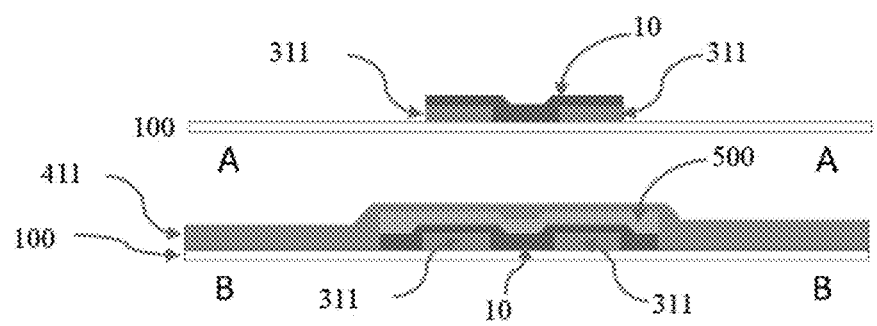

FIGS. 4A to 4E illustrate a process of fabricating a display substrate in some embodiments according to the present disclosure. Referring to FIG. 4A, a plurality of first sensing electrodes 310 are formed on a base substrate. Each of the plurality of first sensing electrodes 310 is formed to includes a pair of first sub-electrodes 311. Referring to FIG. 4B, an insulating layer 500, a plurality of first photoconductive bridges 10, and a plurality of second photoconductive bridges 20 are formed on the plurality of first sensing electrodes 310. Optionally, the insulating layer 500, the plurality of first photoconductive bridges 10, and the plurality of second photoconductive bridges 20 are formed by sequentially depositing a photoconductive material layer and an insulating material layer, patterning the photoconductive material layer and the insulating material layer using a half-tone or gray-tone mask plate thereby obtaining the insulating layer 500, the plurality of first photoconductive bridges 10, and the plurality of second photoconductive bridges 20. FIG. 4C shows cross-sectional views along the A-A and B-B lines in FIG. 4B. Referring to FIG. 4C, orthographic projections of the insulating layer 500 on the base substrate substantially cover orthographic projections of the at least some of the plurality of first photoconductive bridges 10 on the base substrate (cross-sectional view along the B-B line), and orthographic projections of the at least some of the plurality of first photoconductive bridges on the base substrate are substantially non-overlapping with orthographic projections of the plurality of insulating blocks on the base substrate (cross-sectional view along the A-A line). Referring to FIG. 4D, a plurality of second sensing electrodes 410 are formed. Each of the plurality of sensing electrodes 410 is formed to includes a pair of second sub-electrodes 411. FIG. 4E shows cross-sectional views along the A-A and B-B lines in FIG. 4D.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate, comprising:
   a base substrate;
   a first sensing layer comprising a plurality of first sensing electrodes extending substantially along a first direction; and
   a second sensing layer insulated from the first sensing layer and comprising a plurality of second sensing electrodes extending substantially along a second direction;
   wherein each of the plurality of first sensing electrodes comprises a pair of first sub-electrodes substantially parallel to each other and extending substantially along the first direction, and a plurality of first photoconductive bridges each of which interposed between the pair of first sub-electrodes; and
   each of the plurality of second sensing electrodes comprises a pair of second sub-electrodes substantially parallel to each other and extending substantially along the second direction, and a plurality of second photoconductive bridges each of which interposed between the pair of second sub-electrodes.

2. The display substrate of claim 1, wherein an electrical resistance of each of the plurality of first photoconductive bridges decreases upon exposure to increasing light levels, and vice versa; and
   an electrical resistance of each of the plurality of second photoconductive bridges decreases upon exposure to increasing light levels, and vice versa.

3. The display substrate of claim 1, wherein a first current flow between the pair of first sub-electrodes undergoes a change upon exposure of one of the plurality of first photoconductive bridges to light; and
   a second current flow between the pair of second sub-electrodes undergoes a change upon exposure of one of the plurality of second photoconductive bridges to light.

4. The display substrate of claim 1, wherein the plurality of first sensing electrodes and the plurality of second sensing electrodes cross over each other thereby forming a plurality of intersection regions; and
   the display substrate further comprises an insulating layer between the first sensing layer and the second sensing layer;
   wherein the insulating layer comprises a plurality of insulating blocks; and
   each of the plurality of insulating blocks is at one of the plurality of intersection regions.

5. The display substrate of claim 4, wherein at least some of the plurality of first photoconductive bridges and at least some of the plurality of second photoconductive bridges are outside the plurality of intersection regions; and
   orthographic projections of the at least some of the plurality of first photoconductive bridges and the at least some of the plurality of second photoconductive bridges on the base substrate are substantially non-overlapping with orthographic projections of the plurality of insulating blocks on the base substrate.

6. The display substrate of claim 4, wherein at least some of the plurality of first photoconductive bridges are in the plurality of intersection regions; and
   orthographic projections of the plurality of insulating blocks on the base substrate substantially cover orthographic projections of the at least some of the plurality of first photoconductive bridges on the base substrate.

7. The display substrate of claim 1, further comprising a black matrix;
   wherein an orthographic projection of the black matrix on the base substrate substantially covers orthographic projections of the plurality of first sensing electrodes and the plurality of second sensing electrodes on the base substrate.

8. The display substrate of claim 7, wherein the black matrix is on a side of the first sensing layer and the second sensing layer distal to a side of the display substrate configured to receive external light.

9. The display substrate of claim 1, wherein the plurality of first sensing electrodes and the plurality of second sensing electrodes are configured to be operated in a time-division driving mode;
   the time-division driving mode comprises a touch control mode and a light control mode;
   the plurality of first sensing electrodes and the plurality of second sensing electrodes are configured to transmit touch signals during the touch control mode; and
   one of the plurality of first sensing electrodes are provided with an electrical potential difference between the pair of first sub-electrodes during the light control mode for detecting a first current flow between the pair of first sub-electrodes upon exposure of one of the plurality of first photoconductive bridges to light; and
   one of the plurality of second sensing electrodes are provided with an electrical potential difference between the pair of second sub-electrodes during the light control mode for detecting a second current flow between the pair of second sub-electrodes upon exposure of one of the plurality of second photoconductive bridges to light.

10. The display substrate of claim 1, wherein the plurality of first photoconductive bridges and the plurality of second sensing electrodes comprise a photosensitive resistance material.

11. The display substrate of claim 10, wherein the photosensitive resistance material comprises one or a combination of cadmium sulfide, selenium, aluminum sulfide, lead sulfide, and bismuth sulfide.

12. The display substrate of claim 10, wherein the photosensitive resistance material has a response time no more than 30 milliseconds;
   a photocurrent spectrum of the photosensitive resistance material has a peak wavelength in a range of approximately 520 nm to approximately 600 nm; and a ratio of illuminated resistance to unilluminated resistance of the photosensitive resistance material is no more than 0.1.

13. A display apparatus, comprising the display substrate of claim 1.

14. The display apparatus of claim 13, further comprising a black matrix;
wherein an orthographic projection of the black matrix on the base substrate substantially covers orthographic projections of the plurality of first sensing electrodes and the plurality of second sensing electrodes on the base substrate; and
the black matrix is on a side of the first sensing layer and the second sensing layer distal to a light emitting side of the display apparatus.

15. A method of controlling a display apparatus of claim 13, comprising:
sequentially applying a first electrical potential difference one-by-one to the plurality of first sensing electrodes, the first electrical potential difference being applied between the pair of first sub-electrodes of each of the plurality of first sensing electrodes;
sequentially detecting a first current flow one-by-one in the plurality of first sensing electrodes, the first current flow being a current flow between the pair of first sub-electrodes of each of the plurality of first sensing electrodes;
sequentially applying a second electrical potential difference one-by-one to the plurality of second sensing electrodes, the second electrical potential difference being applied between the pair of second sub-electrodes of each of the plurality of second sensing electrodes; and
sequentially detecting a second current flow one-by-one in the plurality of second sensing electrodes, the second current flow being a current flow between the pair of second sub-electrodes of each of the plurality of second sensing electrodes.

16. The method of claim 15, further comprising:
determining a light control position by detecting a current flow greater than a first threshold value between the pair of first sub-electrodes of one of the plurality of first sensing electrodes; and
detecting a current flow greater than a second threshold value between the pair of second sub-electrodes of one of the plurality of second sensing electrodes.

17. The method of claim 16, further comprising irradiating light in a region of the display apparatus, thereby inducing the increase in the first current flow between the pair of first sub-electrodes of one of the plurality of first sensing electrodes and the increase in the second current flow between the pair of second sub-electrodes of one of the plurality of second sensing electrodes.

18. The method of claim 16, wherein the display apparatus further comprises a processor configured to execute one or more instructions;
the method further comprises:
selecting a command by the processor from a plurality of programed commands as a selected command based on a location of the light control position; and
executing the selected command by the processor.

19. The method of claim 15, wherein the plurality of first sensing electrodes and the plurality of second sensing electrodes are configured to be operated in a time-division driving mode;
the time-division driving mode comprises a touch control mode and a light control mode;
the method further comprises:
transmitting touch signals through the plurality of first sensing electrodes and the plurality of second sensing electrodes during the touch control mode; and
sequentially applying the first electrical potential difference one-by-one to the plurality of first sensing electrodes, sequentially detecting the first current flow one-by-one in the plurality of first sensing electrodes, sequentially applying the second electrical potential difference one-by-one to the plurality of second sensing electrodes, and sequentially detecting the second current flow one-by-one in the plurality of second sensing electrodes, during the light control mode.

20. A method of fabricating a display substrate, comprising:
forming a first sensing layer comprising a plurality of first sensing electrodes extending substantially along a first direction on a base substrate; and
forming a second sensing layer insulated from the first sensing layer and comprising a plurality of second sensing electrodes extending substantially along a second direction;
wherein each of the plurality of first sensing electrodes is formed to comprise a pair of first sub-electrodes substantially parallel to each other and extending substantially along the first direction, and a plurality of first photoconductive bridges each of which interposed between the pair of first sub-electrodes; and
each of the plurality of second sensing electrodes is formed to comprise a pair of second sub-electrodes substantially parallel to each other and extending substantially along the second direction, and a plurality of second photoconductive bridges each of which interposed between the pair of second sub-electrodes.

* * * * *